United States Patent Office 3,071,507
Patented Jan. 1, 1963

3,071,507
PHENOTHIAZINE COMPOSITION
Donald E. Vierling, 4594 Doverdell Drive,
Pittsburgh, Pa.
No Drawing. Continuation of application Ser. No. 623,319, Nov. 20, 1956. This application Dec. 16, 1958, Ser. No. 780,663
5 Claims. (Cl. 167—53)

This invention relates to anthelmintic compositions, and more particularly to treated phenothiazine.

Phenothiazine is, of course, a well known anthelmintic or dewormer for livestock, its use having been initiated approximately twenty (20) years ago by the Department of Agriculture of the United States.

This discovery of phenothiazine as an anthelmintic was the result of attempts to alleviate a terrific parasite problem in sheep which was nation-wide. Numerous chemicals were tried before phenothiazine was found to be an excellent dewormer for parasites in sheep.

With this discovery, there arose the problem of administering the full therapeutic dose of phenothiazine to the sheep to be treated. After numerous tests, it was found that, so far as sheep were concerned, a full therapeutic dose of phenothiazine was 25 grams per adult animal. In order to administer such a quantity of phenothiazine to the animal, it was first proposed to form a large pill or bolus (or similar compacted mass) of phenothiazine and to force this mass into the stomach of the animals through the mouth. In the early stages, this large pill or bolus was coated with grease and pushed into the animal's mouth by hand and thence into the throat and stomach. Later, a balling gun was developed to shoot these pills down the animal's throat.

In addition to these difficulties, it was, of course, necessary to round up the animals prior to treatment. As will be readily appreciated, the aforementioned activities require considerable work and time. However, once the sheep are rounded up and placed in a certain position, they tend to become mesmerized, and the administration by hand is not, of itself, very difficult.

Although the administration to sheep of phenothiazine in the pill form was fairly satisfactory into the early 1940's, it was then proposed to make the phenothiazine in the form of a drench slurry. This method comprises placing bentonite clay in a given amount of water and then mixing in the phenothiazine with agitation until there is obtained a liquid having the consistency of pea soup and containing approximately 12½ grams of phenothiazine per fluid ounce. This phenothiazine drench slurry is then drawn up into a syringe-type apparatus known as a drenching gun; and the outlet of the gun is placed in the animal's throat manually and the drench slurry forced into the animal's stomach. Thus, the use of phenothiazine drench slurry facilitated the manual administration of phenothiazine to sheep and made it a somewhat easier operation.

In addition to administering the full therapeutic dose of phenothiazine to sheep, the common practice in the early 1940's was to maintain before the sheep to be treated a phenothiazine salt mixture containing approximately 10% by weight of phenothiazine. This is usually referred to as the "low level self-administered dosage" of phenothiazine; and through it, there is administered approximately ¼ to 1 gram of phenothiazine per animal per day. The general practice was to give the sheep a full therapeutic dose two to four times a year and keep the phenothiazine salt mixture before them at all times. This method of controlling parasites proved to be very effective in sheep.

In the late 1940's, it was found that there was also a very serious nation-wide internal parasite problem with cattle. Again, various drugs were tested; and it was found that phenothiazine was best suited.

In order to get the cattle deworming program under way, the phenothiazine drench slurry was used as the source of the anthelmintic. In order to administer the slurry, it was necessary to round up the cattle and manually force the slurry into them. However, the manual administration of phenothiazine drench slurry to cattle presents a decidedly more complex problem than does its manual administration to sheep. After the animals were placed in the pens, it was necessary to put each one in a chute and have a team of four to six men hold its head, open its mouth, and manually force the phenothiazine drench slurry into its stomach. Not only were these activities arduous and hazardous, but the very act of rounding up of the animals placed them under a severe tension, followed by a tendency to go off feed, with the result that they lost weight and were subject to additional diseases. Under normal conditions, the phenothiazine drench slurry had to be administered two to four times a year.

Due to the aforementioned difficulties, the actual use of phenothiazine drench slurry in cattle was relatively small and limited mainly to animals in the last stages of parasitic condition wherein they were so weak and run down that it was relatively easy to round them up and administer the phenothiazine to them. As will be readily appreciated, this is the worst possible stage in which to administer the anthelmintic, the recommended practice being, of course, to treat the animals while they are healthy, thereby enabling the internal parasites to be kept at a minimum. Once the internal parasite load is permitted to build up to a large scale, it is often impossible to save the animal even though the parasites are eliminated by treatment. In other words, the animal frequently is in such a weakened condition, that it will not survive regardless of the manner in which it is treated.

Confronted with the aforementioned problems, applicant set about to develop a method of administering phenothiazine to cattle by "self-administration," or having them ingest it through their own free choice. This proved to be a very difficult task, as cattle have a very strong distaste for phenothiazine and, under normal conditions, will not eat it when it is mixed in with palatable feeds or other forms. With this in mind, applicant and his associates conducted numerous experiments at their experimental farm to discover a palatable form of phenothiazine that could be given to the cattle in the full therapeutic dose in their regular feed regimen.

Early in these experiments, it was determined that there must be formulated a palatable phenothiazine which would readily be eaten by the animal in a short period of time, say within an hour or so. This is due to the fact that, when cattle regurgitate their feed, they could taste phenothiazine; and even though they could not reject this particular batch of feed, they would recall its unpleasant characteristics to such an extent that they would not eat a similar batch of material for a period of two to three weeks. However, since the animals had to be given the full therapeutic dosage at the most only four times a year, it was realized that the problem would be solved of the full therapeutic dose could be administered before the regurgitated.

The difficulties referred to hereinbefore are avoided by the treated phenothiazine compositions of the present invention, for not only is the phenothiazine rendered more desirable and palatable to the host animal, but also it is consumed by the animal in truly therapeutic amounts. At the same time, the therapeutic efficacy is maintained.

The improved composition of the present invention comprises phenothiazine, substantially each particle of which is preferably substantially enveloped with flavoring media. The purpose of the flavoring media is to mask the objectionable odor and taste of the phenothiazine particles to the host animal. Not only must the particular flavoring medium used be selected with care (for it must itself be extremely palatable to the host animal), but the amount used and the surface area of the individual phenothiazine particles coated therewith are critical if the animal is to be induced to consume the same in truly therapeutic amounts.

In general, the amount of flavoring medium which must be used is at least about one percent by weight, but preferably about 5 to 20 percent by weight relative to the phenothiazine; and, as before mentioned, in order to mask the taste and odor of the phenothiazine to the host animal, the individual particles thereof are preferably substantially enveloped with the flavoring medium. While good results will still be obtained if the average phenothiazine particle has at least 30 percent of its surface covered with the flavoring medium, best results are obtained when about 50 to about 80 percent of the surface area of the individual phenothiazine particles are so covered.

As flavoring media, any agent which has an extremely palatable taste to the host animal is satisfactory, provided it will form a substantially dry, adhering coating on the phenothiazine particles. Examples of flavoring media, singly or in combination, which can be satisfactorily used in practicing the teachings of the invention are anise, anethole, sesame, eucalyptus, chenopodium, fenugreek, ginger, imitation alfalfa flavor, corn syrup, imitation hay flavor, licorice, licorice root powder, malt, molasses (blackstrap, beet, citrus, corn, ammoniated, etc.), non-caloric sweeting agents, such as cyclohexylsulfamate (sodium or calcium), sugar, etc. In order to assist the coating of the phenothiazine particles with the flavoring media, wetting agents such as lecithin, alkyl aryl sulfonates, hydroxyphosphatide, triethanolamine, etc., may be used. The amount of wetting agent used, relative to the flavoring media is at least about ⅛ percent by weight, and preferably about ¼ to about one percent by weight. I have found that, when the wetting agent is used in combination with the flavoring media as defined, the percent of surface area of the phenothiazine particle which is coated is increased about 10 to about 40 percent over that obtained when the flavoring media is used alone.

The particle size of the phenothiazine is not critical, although it is preferably extremely finely divided so that the coating thereof is facilitated and the masking of the characteristics taste and odor thereof is assured. Generally, the phenothiazine has an average particle size of at least about 1 to about 30 microns; preferably about 10 microns.

Any method which will assure the obtaining of a coating of flavoring medium on the phenothiazine particles, as defined, to the desired extent can be employed. Thus, the flavoring medium may be combined with a carrying fluid, such as water, and sprayed on a moving bed of phenothiazine particles, or the two can be tumbled in known fashion, after which the carrying fluid can be removed by drying. For example, I have prepared a flavoring medium consisting of 45 percent by weight of anise, 20 percent by weight of fenugreek, 20 percent by weight of limitation alfalfa flavor, and 15 percent by weight of licorice flavor. Five (5) grams of this flavoring medium was sprayed in a finely divided mist over 95 grams of phenothiazine having an average particle size of 10 microns. The mixture was tumbled in a closed container having a volume of one cubic foot revolving 11 times a minute and maintained at atmospheric pressure and a temperature of 72° F. At the end of one hour, the operation was stopped; and it was found that the average phenothiazine particle was coated over 85 percent of its surface. The determination of the amount of surface coated was as follows:

To the flavoring medium was added 0.05 gram of a deep red food dye (F & DC Red #2). After the tumbling operation, representative samples of coated phenothiazine particles were taken and carefully inspected under a microscope to determine the percent of the surface of each phenothiazine particle that was coated with the flavoring medium.

The invention can best be illustrated by the following examples:

*Example I*

Eight calves weighing approximately 400 pounds each were placed on a dry lot and fed a ground grain feed containing approximately one part by weight of oats, one part by weight of corn, and one part by weight of wheat. These animals were given this feed for a seven-day period; and it was found that they consumed an average of 12 pounds of feed per animal per day. Approximately one percent by weight of phenothiazine NF powder (having an average particle size of 10 microns) was then added to this feed mixture and thoroughly mixed therewith. This medicated feed mixture was placed before these animals for a 24-hour period. At the end of this period, the feed was removed; and it was found that consumption of this feed admixed with phenothiazine had dropped to 2 pounds per animal per day. This means that each animal had consumed approximately 9 grams of phenothiazine, which is far below the full therapeutic dose of 40 grams for such animals. The same feed with admixed phenothiazine was placed bebore the cattle, and the second day the feed consumption dropped to 1¼ pounds per animal per day (5½ grams of phenothiazine per animal per day). On the third day, the feed consumption dropped to ¾ pound of medicated feed per animal per day (3½ grams of phenothiazine per animal per day). At this point, the feed with admixed phenothiazine was removed and the animals placed on their regular unmedicated feed regimen. The animals immediately consumed 15 pounds of unmedicated feed per animal in a 24-hour period.

*Example II*

In a subsequent test, a feed mixture containing approximately one part by weight of ground oats, one part by weight of ground corn, and one part by weight of ground soybean meal fortified with 10 percent by weight of blackstrap molasses was placed before 10 calves weighing approximately 350 pounds each. In a seven-day period, these calves consumed on the average 11 pounds of this feed per animal per day. One percent by weight of phenothiazine powder (having an average particle size of 10 microns) was then thoroughly admixed with this feed mixture; and the same was placed before the same animals for a 24-hour period. It was found that, during this period, each calf consumed approximately 2¼ pounds of this medicated mixture, and thereby ingested 10 grams of phenothiazine per day, which is far below the full therapeutic dose of approximately 35 grams of phenothiazine for calves of this weight. The same medicated feed was left before these calves, and the second day their feed consumption dropped to 1½ pounds per animal (i.e., 7 grams of phenothiazine per animal per day). On the third day, the medicated feed consumption dropped to ½ pound per animal (2¼ grams of phenothiazine per animal per day). The feed so medicated was removed and the animals placed on their regular unmedicated feed regimen which they immediately consumed at the rate of 12½ pounds of (unmedicated) feed per animal in a 24-hour period.

*Example III*

In a subsequent test, a mixture of ground feed containing approximately one part by weight of ground oats, one part by weight of ground wheat, and one part by weight of ground soybean meal fortified with 10 percent by weight of blackstrap molasses was placed before 20 beef cattle having an average weight of 600 pounds. This feed was fed to the animals for a 7-day period; and it was found that each animl consumed approximately 20 pounds of this feed per day. One percent by weight of phenothiazine NF powder (having an average particle size of 10 microns) was then thoroughly admixed with the feed mixture. The resulting mixture was then placed before the same 20 beef cattle for a 24-hour period. At the end of the 24-hour period, the feed was withdrawn, and it was found that each animal had consumed approximately 12½ grams of phenothiazine powder, which is far below the 60 grams required for a full therapeutic treatment for such animals. The same medicated feed was left with the cattle; and the second day the feed consumption dropped to 1¾ pounds per animal (8 grams of phenothiazine per animal per day). On the third day, the consumption of this medicated feed dropped to ¾ pound per animal per day (3½ grams of phenothiazine per animal per day). The feed so medicated was removed and the animals placed on their regular unmedicated feed regimen which they immediately consumed at the rate of 24 pounds of (unmedicated) feed per animal in a 20-hour period.

It is readily apparent from the foregoing examples that the incorporation of any appreciable quantity of phenothiazine to ordinarily palatable feed mixtures greatly reduces the palatability of the medicated feed mixtures so that the intake of the medicated feed is reduced to a point where only a small fraction of the amount of phenothiazine required for the full therapeutic dose is ingested. At the same time, the intake of the feed mixture itself is reduced.

Subsequent tests wherein the amount of phenothiazine added to the ground feed was increased to 5 and 10 percent by weight, respectively, decreased the palatability of the medicated feed mixture to a point where the total intake of the medicated feed was materially reduced; and the total amount of phenothiazine itself was also materially reduced. Actually, the highest intake of phenothiazine was obatined when the percent of phenothiazine added to the feed was no greater than one-eighth percent by weight of phenothiazine NF powder having an average particle size of 10 microns. This intake amounted to 12 grams of phenothiazine per day for adult beef cattle weighing 1000 pounds each, which is far below the 60 grams of phenothiazine required for the full therapeutic dosage for such animals. However, even when this medicated feed mixture containing one-eighth percent by weight of phenothiazine was left with these cattle for seven days, the feed intake dropped considerably, so that the total intake of phenothiazine for the total seven-day period was only 26 grams, which, again, is far below the full therapeutic dose of 60 grams per adult cattle.

As noted, merely coating the individual particles of phenothiazine with a flavoring medium is not sufficient to render the phenothiazine particles palatable to the host animal if the amount of surface coated is below the defined critical amount, namely, about 30 percent. This is shown below in the example immediately following:

*Example IV*

A feed mixture containing one part by weight of ground oats, one part by weight of ground corn, and one part by weight of soybean meal fortified with 10 percent by weight of blackstrap molasses was placed before 12 beef cattle weighing approximately 800 pounds each for a 7-day period. At the end of this period, it was found that each animal consumed approximately 20 pounds of the feed mixture per day. Then, there was admixed with each 20 pounds of this feed mixture 60 grams of phenothiazine having an average particle size of 10 microns, each particle of which had approximately 25 percent of its surface coated with a flavoring medium consisting of 45 percent by weight of anise, 20 percent by weight of fenugreek, 20 percent by weight of imitation alfalfa flavor, and 15 percent by weight of licorice flavor. The animals were given this medicated ground feed as a one-day treatment. At the end of the 24-hour period, it was found that each animal had consumed approximately 4 pounds of the medicated feed. This means that each animal consumed approximately 12 grams of phenothiazine in the 24-hour period. The same ground feed so medicated was left with the same animals for an additional consecutive 24 hours, during which the consumption dropped to 2½ pounds of feed per animal per 24-hour period. This is equivalent to 7½ grams of phenothiazine per animal. The same medicated feed was left with the same animals for a third consecutive day. At the end of this third 24-hour period, the consumption of feed so medicated dropped to 2 pounds per animal per 24-hour period (6 grams of phenothiazine per animal for a 24-hour period.) At the end of the three-day period, the animals were put back on the regular unmedicated feed; and they consumed 26 pounds thereof in 24 hours.

That phenothiazine treated in accordance with the teachings of the present invention will produce the desired results is shown below in the examples immediately following:

*Example V*

Example IV was repeated two months later on the same animals, each of which weighed approximately 840 pounds and was consuming 24 pounds of the unmedicated feed per day. This time, the phenothiazine particles were so coated with the same flavoring medium of Example IV that approximately 35 percent of the surface of the individual particles was coated. As before, 60 grams of coated phenothiazine particles were admixed with each 24 pounds of the ground feed. At the end of the 24-hour period, it was found that each of the animals had consumed 24½ pounds of the medicated mixture. This means that each animal had ingested about 61 grams of phenothiazine, which is slightly greater than the full therapeutic dose of 60 grams for such animals.

*Example VI*

Example V was repeated in identical fashion, except that approximately 55 percent of the surface area of the average phenothiazine particle was coated. Each animal consumed 25 pounds of feed so medicated in a 24-hour period, which is equivalent to 63 grams of phenothiazine per animal.

*Example VII*

Example V was again repeated under identical conditions, except that about 98 percent of the surface area of the average phenothiazine particle was coated with the flavoring medium so described. Each animal consumed 24 pounds of feed in a 24-hour period, equivalent to 60 grams of phenothiazine per animal.

*Example VIII*

A feed mixture containing one part by weight of ground oats, one part by weight of ground corn and one part by weight of ground soybean meal was placed before a group of 10 different beef cattle weighing approximately 650 pounds each for a 7-day period. At the end of this period, it was found that each animal consumed approximately 22 pounds of this feed mixture. To this feed mixture there was added one percent by weight of phenothiazine particles having an average size of 10 microns, approximately 55 percent of each particle of which was coated with a flavoring medium consisting of 33⅓ percent by weight of anise, 33⅓ percent by weight of fenugreek, and 33⅓ percent by weight of corn syrup (together with one-third percent by weight based on this composition of triethanolamine); and the same was left with these 10 cattle for a 24-hour period. At the end of this 24-hour period, the feed so medicated was removed; and it was found that each animal had consumed approximately 15 pounds (i.e., 65 grams of phenothiazine), which is considerably in excess of the full therapeutic dose of 60 grams of phenothiazine for such animals.

*Example IX*

In another test, a mixture consisting of approximately one part by weight of ground wheat, one part by weight of ground oats and one part by weight of soybean meal was placed before 30 sheep weighing approximately 75 pounds each for a 7-day period. At the end of this period, it was found that each of these sheep had consumed approximately 7 pounds of the feed per day. One percent by weight of phenothiazine coated as in Example VIII was thoroughly admixed with this feed; and, at the end of a 24-hour period, it was found that each of these sheep had consumed approximately 6 pounds of the feed (26 grams of phenothiazine). This is in excess of the full therapeutic dose of 25 grams of phenothiazine per adult sheep.

*Example X*

In still another test, 45 adult cattle weighing approximately 800 pounds each were put on a lush pasture. The animals were brought into a dry lot and were fed a regular grain feed to which one percent by weight of phenothiazine having a particle size of 10 microns, and each particle of which was approximately 80 percent coated with a flavoring medium consisting of 33⅓ percent by weight of anise, 33⅓ percent by weight of imitation alfalfa flavor, 30 percent by weight of timothy hay flavor, and ⅓ percent by weight of lecithin. In a 24-hour period, it was found that each of these adult beef cattle had consumed an average of 16½ pounds of the medicated feed (71 grams of phenothiazine, which, again, is in excess of the full therapeutic dosage of 60 grams for such animals).

Equally successful results were obtained by the same experiments on swine, horses, mules and goats.

From the latter examples, it is apparent that no difficulty whatsoever is experienced in administering to the host animal the full therapeutic dose of phenothiazine provided the same has been treated as herein described. Thus, the treated phenothiazine can be incorporated in a regular grain feed; and the full therapeutic dose will be self-administered by the animal in a simple, effective manner. This, of course, completely eliminates rounding up the animals and dosing them individually with the resultant wear and tear on both man and beast. Moreover, the use of the phenothiazine of this invention enables farmers to deworm livestock without obtaining the additional manpower generally required in the usual type of deworming operation.

This application is a continuation of my patent application Serial No. 623,319 entitled "Phenothiazone Product and Method of Making Same," filed November 20, 1956, which, in turn, is a continuation-in-part of my patent application Serial No. 410,031, filed February 12, 1954, bearing the same title, both now abandoned.

Obviously, many modifications and variations of the invention, as hereinabove set forth, can be made without departing from the spirit and scope thereof, and therefore only such limitations should be imposed as are indicated in the appended claims.

I claim:

1. A composition of matter, comprising finely divided phenothiazine having an average particle size of at least about 1 micron to about 30 microns, substantially each particle of which has at least about 30 percent of the surface area thereof coated with a flavoring medium, the total amount of flavoring medium being about 1 percent to about 20 percent by weight.

2. A composition as in claim 1 wherein the particle has about 30 percent to about 80 percent of the surface area thereof coated with said flavoring medium.

3. A composition as in claim 1 wherein the amount of flavoring medium present is about 5 percent to about 20 percent by weight.

4. A composition as in claim 1 wherein the phenothiazine particle has an average particle size of about 10 microns.

5. A composition as in claim 1 wherein the phenothiazine particle has an average particle size of about 10 microns, and the individual phenothiazine particles have about 30 percent to about 50 percent of the surface area thereof coated with said flavoring medium, and the amount of flavoring medium present is about 5 percent to about 20 percent by weight.

References Cited in the file of this patent

UNITED STATES PATENTS 2,840,504     Vierling _____ June 24, 1958

OTHER REFERENCES

Cauthen: Flour and Feed, December 1955, pages 7 and 8.

Douglas: Am. J. Vet. Research, vol. 17, No. 63, April 1956, pages 318–323.

McCulloch: J. Am. Vet. Med. Ass'n, vol. 101, No. 785, pages 114, 117, 118 and 119.